United States Patent
Watanabe (10) Patent No.: US 8,842,309 B2
(45) Date of Patent: Sep. 23, 2014

(54) FACSIMILE CONTROL APPARATUS

(75) Inventor: Kenichi Watanabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 231 days.

(21) Appl. No.: 13/410,890

(22) Filed: Mar. 2, 2012

(65) Prior Publication Data

US 2012/0224233 A1 Sep. 6, 2012

(30) Foreign Application Priority Data

Mar. 3, 2011 (JP) .................................. 2011-046142
Mar. 1, 2012 (JP) .................................. 2012-045044

(51) Int. Cl.
*G06K 15/00* (2006.01)
*H04N 1/327* (2006.01)
*H04N 1/00* (2006.01)

(52) U.S. Cl.
CPC ....... *H04N 1/00891* (2013.01); *H04N 1/32793* (2013.01); *H04N 2201/0093* (2013.01)
USPC ......... 358/1.14; 358/1.15; 358/1.13; 358/437

(58) Field of Classification Search
CPC ................................................ G03G 15/5004
USPC ................ 358/1.14, 1.15, 1.9, 1.13, 437, 441
See application file for complete search history.

(56) References Cited

U.S. PATENT DOCUMENTS

| | | | | |
|---|---|---|---|---|
| 5,666,355 | A * | 9/1997 | Huah et al. ..................... | 370/311 |
| 6,016,339 | A * | 1/2000 | Hoy et al. ................ | 379/106.07 |
| 7,007,182 | B1 * | 2/2006 | Tsumura ....................... | 713/324 |
| 2002/0101622 | A1* | 8/2002 | Yamaguchi ................... | 358/423 |
| 2003/0179818 | A1* | 9/2003 | D'Angelo et al. ............ | 375/222 |
| 2004/0004732 | A1* | 1/2004 | Takeda et al. ................ | 358/1.13 |

FOREIGN PATENT DOCUMENTS

JP 3850214 9/2006

* cited by examiner

*Primary Examiner* — Jamares Q Washington
(74) *Attorney, Agent, or Firm* — Oblon, Spivak, McClelland, Maier & Neustadt, L.L.P.

(57) ABSTRACT

A facsimile control apparatus includes a main control unit configured so that power supply to the main control unit is shut off while the facsimile control apparatus is in an energy-saving mode; a first switching unit configured to switch the power supply to the main control unit on/off; and a detection circuit configured to output a switch control signal for turning the first switching unit on when detecting an input signal input from a public network.

7 Claims, 9 Drawing Sheets

FACSIMILE CONTROL APPARATUS

CROSS-REFERENCE TO RELATED APPLICATIONS

The present application claims priority to and incorporates by reference the entire contents of Japanese Patent Application No. 2011-046142 filed in Japan on Mar. 3, 2011 and Japanese Patent Application No. 2012-045044 filed in Japan on Mar. 1, 2012.

BACKGROUND OF THE INVENTION

1. Field of the Invention

The present invention relates to a facsimile control apparatus.

2. Description of the Related Art

For reducing power consumption of a fax control unit (FCU), there is known a technology to shut off most of power supply to a central processing unit (CPU) (a main control unit), a modem, and a secondary circuit, which require a high amount of electric power, but instead install an energy-saving CPU. In this technology, upon receipt of ringing from a telephone circuit, the FCU first inputs a ringing signal to the energy-saving CPU, and then the energy-saving CPU inputs an interrupt signal to the modem, thereby restoring the modem and the secondary circuit to normal state.

However, such a conventional energy-saving system has problems that the energy-saving CPU consumes electric power eventually and the cost is increased by the installation of the energy-saving CPU. Furthermore, in order to return the modem, the secondary circuit, and the main control unit from an energy-saving mode, any parts for detecting an interrupt signal from the energy-saving CPU have to be continuously supplied with electric power, and, after all, electric power is consumed.

For example, Japanese Patent No. 3850214 discloses a method in which an additional energy-saving CPU is installed and power supply to a modem, a secondary circuit, and a main control unit is shut off for the purpose of reducing power consumption of an FCU. However, the problems that the energy-saving CPU consumes electric power and the cost is increased by the installation of the energy-saving CPU are not resolved. Furthermore, any parts for detecting an interrupt signal from the energy-saving CPU have to be continuously supplied with electric power to return the modem, the secondary circuit, and the main control unit from the energy-saving mode.

Therefore, there is a need for a facsimile control apparatus capable of achieving an energy-saving mode and returning from the energy-saving mode without an energy-saving CPU.

SUMMARY OF THE INVENTION

It is an object of the present invention to at least partially solve the problems in the conventional technology.

According to an embodiment, there is provided a facsimile control apparatus that includes a main control unit configured so that power supply to the main control unit is shut off while the facsimile control apparatus is in an energy-saving mode; a first switching unit configured to switch the power supply to the main control unit on/off; and a detection circuit configured to output a switch control signal for turning the first switching unit on when detecting an input signal input from a public network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In control of power supply to a modem, a secondary circuit, and a main control unit, a facsimile control apparatus according to an embodiment is at least characterized as follows.

In the embodiment, the facsimile control apparatus detects a ringing signal using not an energy-saving CPU but a simple logic circuit (a complementary metal-oxide semiconductor (CMOS) logic, etc.) such as a flip-flop. Furthermore, in the present embodiment, upon detection of a ringing signal, the facsimile control apparatus does not input an interrupt signal to the other devices, such as the modem, the secondary circuit, and the main control unit, but controls the power-on/off of the devices by controlling switches mounted on respective power supplies of the devices. The characteristics of the present embodiment are explained in detail with reference to accompanying drawings.

Figure 10:
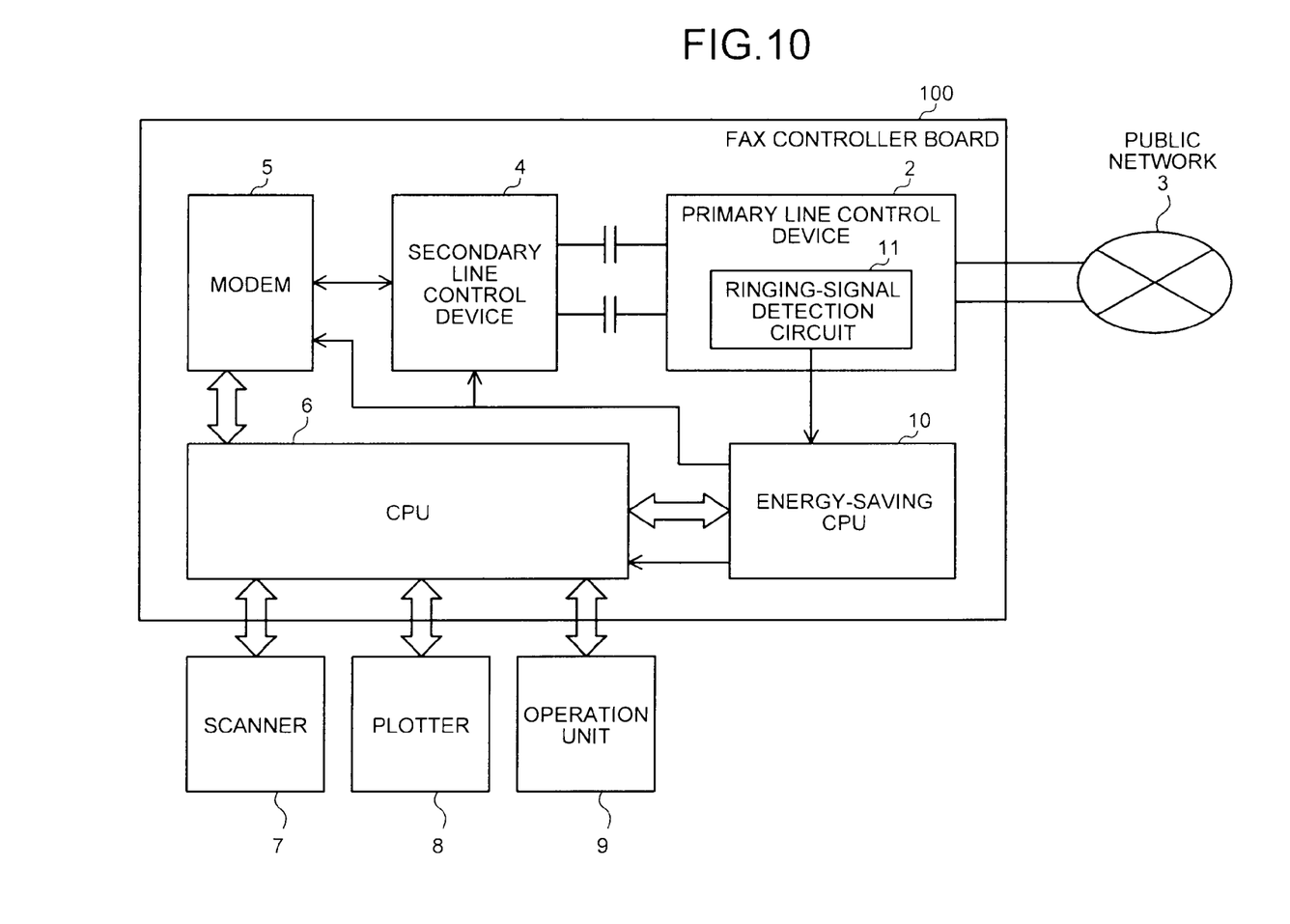
FIG. 10 is a block diagram of a conventional fax controller board.

First, a conventional technology is explained with reference to FIG. 10 to contrast the conventional technology with the present embodiment. FIG. 10 is a block diagram of a conventional fax controller board.

A conventional fax controller board 100 includes a primary line control device 2, a secondary line control device 4, a modem 5, a CPU 6, and an energy-saving CPU 10, etc. The fax controller board 100 is connected to a public network 3, and performs fax transmission through the public network 3.

The primary line control device 2 is connected to the public network 3, and operates by using power remotely fed via the public network 3. The primary line control device 2 includes a ringing-signal detection circuit 11. The ringing-signal detection circuit 11 is connected to the public network 3, and detects the presence or absence of a ringing signal on the public network 3.

The secondary line control device 4 is connected to the modem 5. The modem 5 modulates digital image data read by a scanner 7 and various protocol signals input from the CPU 6 into analog signals so as to send them over the public network 3. Furthermore, the modem 5 demodulates analog signals of image data and various protocol signals sent from the other end via the public network 3 into digital signals. A plotter 8 forms an image on thermal paper or plain paper, etc. on the basis of the digital signals.

An operation unit 9 includes various operation keys, such as a numerical keypad, a START key, one-touch keys, and function keys, and a display unit such as a liquid-crystal display. Various instructions, such as an instruction to send a fax, are input through the operation keys. The CPU 6 acquires content of input key operation.

The fax controller board 100 is also referred to as a fax control unit (FCU). When the whole apparatus, including the fax controller board 100, the scanner 7, the plotter 8, and the operation unit 9, enters an energy-saving state, power supply to the secondary line control device 4, the modem 5, the CPU 6, the scanner 7, the plotter 8, and the operation unit 9 is shut off or reduced. Then, when the ringing-signal detection circuit 11 has detected a ringing signal, the ringing-signal detection circuit 11 first inputs the detected ringing signal to the energy-saving CPU 10. At this time, the energy-saving CPU 10 inputs interrupt signals to the secondary line control device 4, the modem 5, and the CPU 6, respectively, thereby returning the secondary line control device 4, the modem 5, and the CPU 6 from the energy-saving state. Therefore, in the conventional fax controller board 100, the secondary line control device 4, the modem 5, and the CPU 6, which receive an interrupt signal, have to be supplied with electric power although it is a smaller amount of power than that is consumed in a normal state. Furthermore, the energy-saving CPU 10 consumes electric power. Moreover, the cost is increased by newly installing the energy-saving CPU 10.

Figure 1:
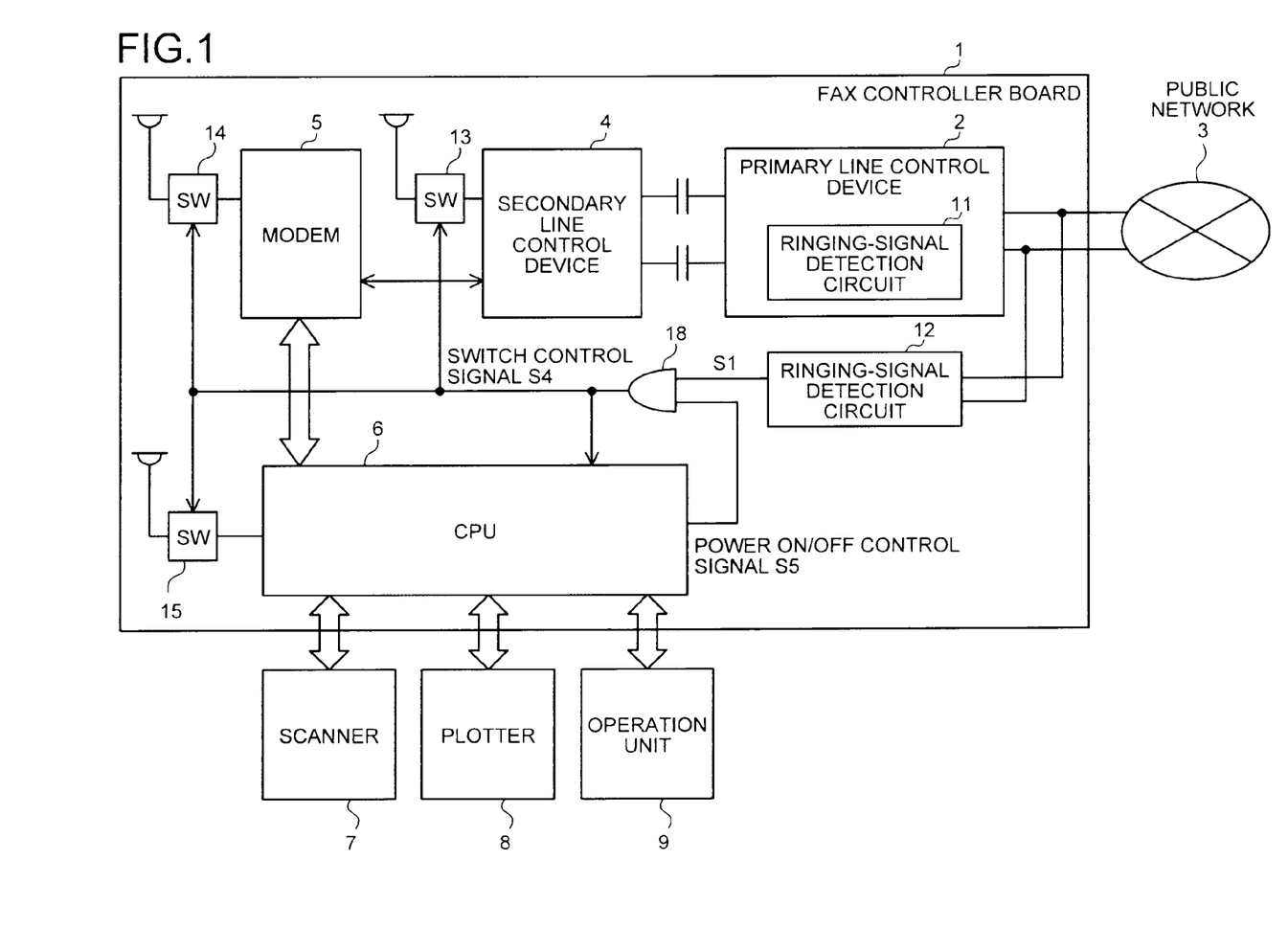
FIG. 1 is a block diagram of a fax controller board according to an embodiment.

FIG. 1 is a block diagram showing a configuration example of a fax controller board 1 according to the present embodiment. Components having the same function as those in FIG. 10 are denoted by the same reference numerals, and description of those components is omitted. The fax controller board 1 according to the present embodiment further includes a ringing-signal detection circuit 12 in addition to the ringing-signal detection circuit 11 included in the conventional fax controller board 100. Furthermore, switches (SW) 13, 14, and 15 are attached to respective power supplies of the secondary line control device 4, the modem 5, and the CPU 6, respectively. The switches 13, 14, and 15 control the power supplies. In the present embodiment, there is no need to install the energy-saving CPU 10. Furthermore, a single switch can be configured to serve as any two or more of the switches 13, 14, and 15 so as to use fewer switches than the number of circuits, etc. of a power supply destination.

On/off control of the switches 13, 14, and 15 is made by a switch control signal S4. For example, the switches 13, 14, and 15 are turned on when the switch control signal S4 is Low, and are turned off when the switch control signal S4 is High. The switch control signal S4 is a signal output from a logic circuit 18 (an AND gate) as being an AND circuit.

The switches 13, 14, and 15 are turned on when either one of an energy-saving return signal S1 and a power on/off control signal S5 is Low, and are turned off when the energy-saving return signal S1 and the power on/off control signal S5 is both High. The switches 13, 14, and 15 are normally turned on by the CPU 6. In other words, in a normal state in which the facsimile control apparatus is not in an energy-saving mode, the CPU 6 outputs Low as the power on/off control signal S5. If there is no operation on the operation unit 9 for over a predetermined period of time and no ringing signal from the public network 3 has been detected, the CPU 6 outputs High as the power on/off control signal S5 to turn the switches 13, 14, and 15 off. Accordingly, the fax controller board 1 enters the energy-saving mode. When the fax controller board 1 becomes the energy-saving mode, the power of the CPU 6 is shut off. At this time, the output of the CPU 6 becomes high impedance and thus the power on/off control signal S5 is kept at High by a pull-up resistor connected to a line of the power on/off control signal S5 (not shown).

After that, when detecting a ringing signal from the public network 3, the ringing-signal detection circuit 12 sets the energy-saving return signal S1 to Low. Therefore, the switches 13, 14, and 15 are turned on. Then, the modem 5, the secondary line control device 4, and the CPU 6 are activated, and the facsimile control apparatus starts receiving a fax as normal. The ringing-signal detection circuit 12 is composed of a CMOS logic, such as a flip-flop. The power consumption of the CMOS logic is about a few microwatts, and this is about one tenth of power consumption of the energy-saving CPU.

Figure 2:
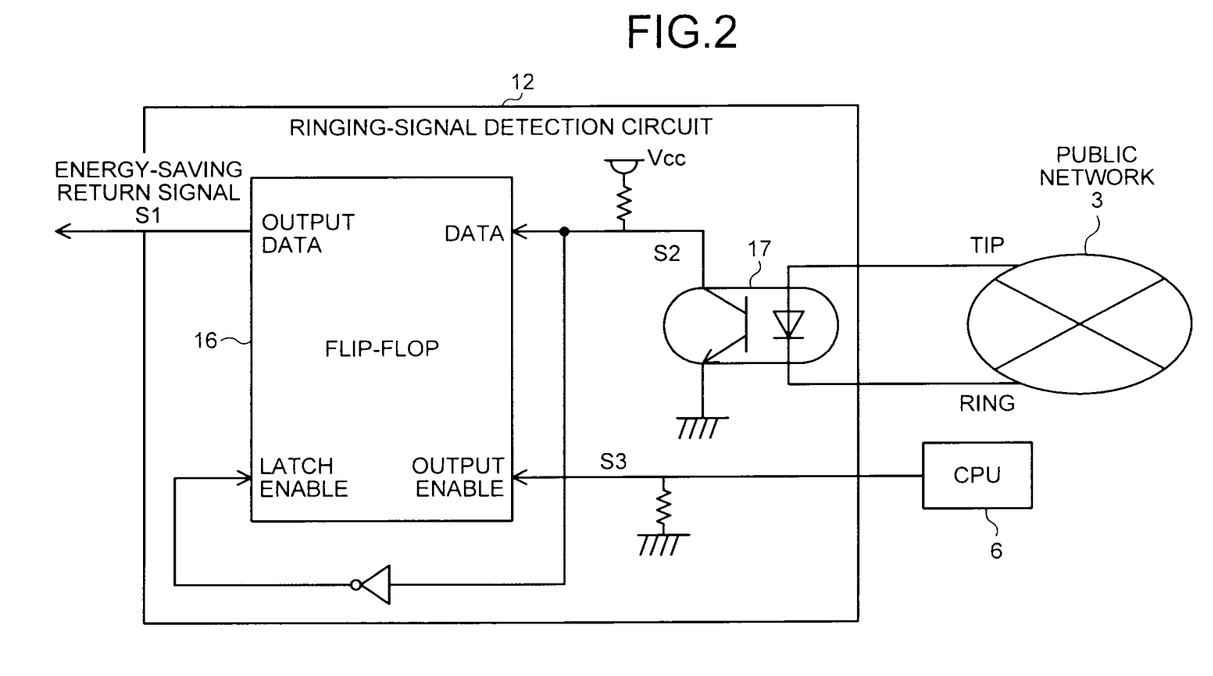
FIG. 2 is a block diagram of a ringing-signal detection circuit.

FIG. 2 is a block diagram showing a configuration example of the ringing-signal detection circuit 12. As shown in FIG. 2, the ringing-signal detection circuit 12 includes a photocoupler 17 and a flip-flop 16. The photocoupler 17 is connected to the public network 3. The flip-flop 16 is controlled by the output of the photocoupler 17 and the CPU 6, and outputs the energy-saving return signal S1.

Figure 3:
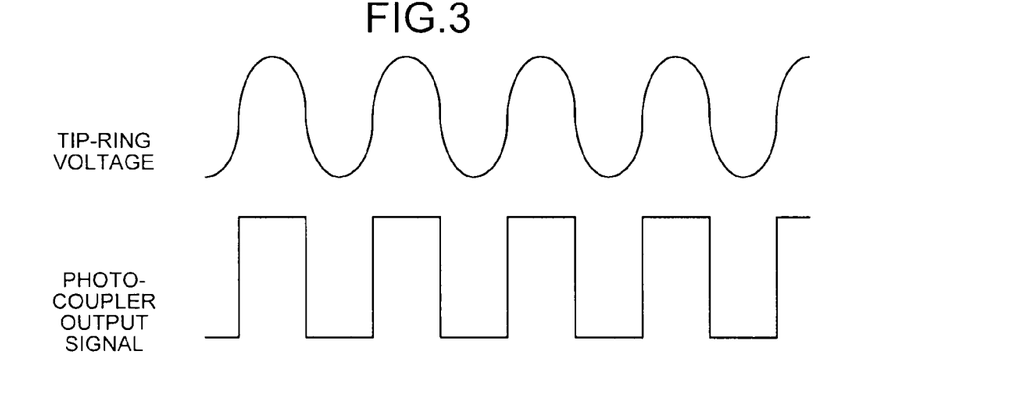
FIG. 3 is a waveform diagram showing the function of a photocoupler.

FIG. 3 is a waveform diagram showing the function of the photocoupler 17. Upon detection of a ringing signal from the public network 3, a waveform shown as a waveform of TIP-RING voltage in FIG. 3 is input to a light-emitting section of the photocoupler 17. A light-receiving section of the photocoupler 17 is turned on when the light-emitting section emits light, and is turned off when the light-emitting section emits no light. When the light-receiving section is turned on, the photocoupler 17 is connected to ground, so a photocoupler output signal S2 becomes Low. When the light-receiving section is turned off, the output of the photocoupler 17 is pulled up to a power-supply voltage Vcc by a pull-up resistor, so a photocoupler output signal S2 becomes High. Therefore, the photocoupler output signal S2 has a waveform as shown in FIG. 3.

Figure 4:
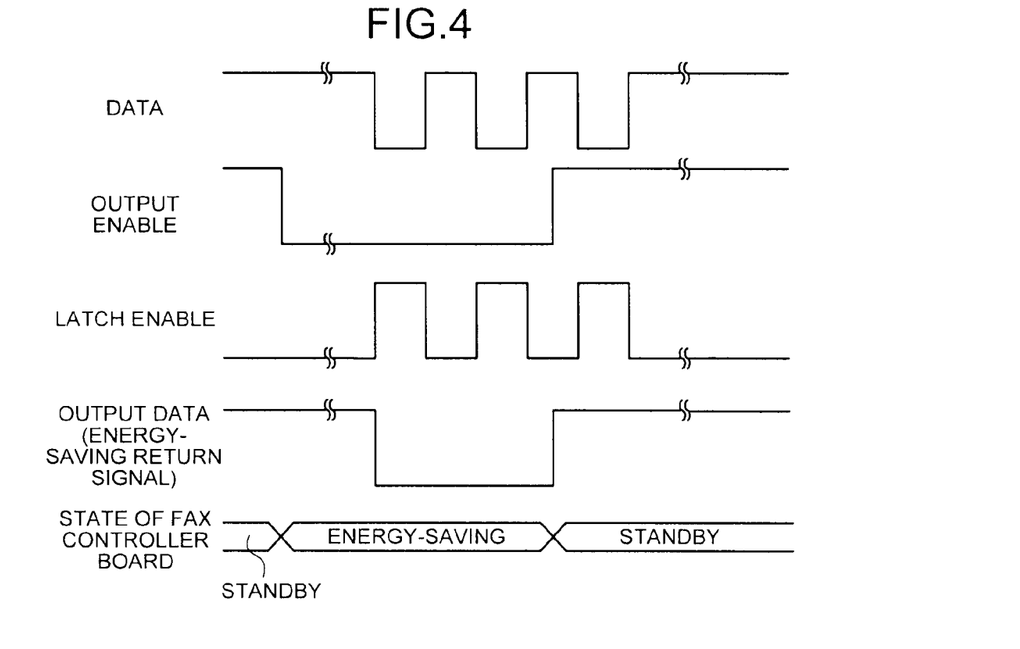
FIG. 4 is a diagram showing an input-output relation of a flip-flop.

FIG. 4 is a diagram showing an input-output relation of the flip-flop 16. A data terminal receives the photocoupler output signal S2. The data terminal is High when the fax controller board 1 is in normal state, and is also High if no ringing signal is input from the public network 3 even when the facsimile control apparatus is in the energy-saving mode. When a ringing signal is input, the data alternates between High and Low. An output enable terminal receives a flip-flop control signal S3 output from the CPU 6. A signal that the photocoupler output signal S2 is inverted is input to a latch enable terminal. An output data terminal outputs the energy-saving return signal S1. The switches 13, 14, and 15 are controlled by the energy-saving return signal S1.

Subsequently, the operation of the flip-flop 16 is explained. When the fax controller board 1 stands by (is in the normal state), the CPU 6 sets the flip-flop control signal S3 to be constantly High. Therefore, the energy-saving return signal S1 output from the flip-flop 16 is disabled.

When the fax controller board 1 enters the energy-saving mode, the power supply to the CPU 6 is turned off. Therefore, the output of the CPU 6 becomes high impedance, and the flip-flop control signal S3 becomes Low by a pull-down resistor connected to a line of the flip-flop control signal S3. Therefore, the output enable of the flip-flop is asserted, and the flip-flop starts the output of the energy-saving return signal S1. Also in the energy-saving mode, if no ringing signal is input from the public network 3, High is input to the data terminal of the flip-flop 16, and High is output from the output data terminal.

When a ringing signal is input from the public network 3, the data terminal shows signal that alternates between High and Low as shown in FIGS. 3 and 4. The latch enable terminal shows a signal inverted to the signal of the data terminal. Therefore, when the data terminal is Low, the latch enable becomes High, and the data signal is output as the output data. Namely, Low is output as the output data. When the data terminal is High, the latch enable terminal becomes Low, so the last data, i.e., Low is continuously output as the output data.

Therefore, once a ringing signal is input, the output data remains Low. Then, the power supply to the modem 5, the secondary line control device 4, and the CPU 6 starts, and the modem 5, the secondary line control device 4, and the CPU 6 start running. When the modem 5, the secondary line control device 4, and the CPU 6 are activated, as normal, the secondary line control device 4 receives the ringing signal detected by the ringing-signal detection circuit 11 of the primary line control device 2, and the facsimile control apparatus starts receiving a fax. Furthermore, the CPU 6 sets the flip-flop control signal S3 to High to stop the output of the flip-flop 16.

In this way, the fax controller board 1 according to the present embodiment achieves the energy-saving mode in which the power supply to at least the main control unit (the CPU 6) is turned off without an energy-saving CPU. Furthermore, when a ringing signal is input from the public network 3, the fax controller board 1 can return from the energy-saving mode.

Therefore, the fax controller board 1 can achieve further power saving because there is no need to supply electric power to the energy-saving CPU 10 unlike the conventional fax controller board provided including the energy-saving CPU 10 as shown in FIG. 10. Furthermore, the switch is attached to a power-supply line between the main control unit and the power supply so as not to supply electric power to the main control unit when the fax controller board 1 is in the energy-saving mode; therefore, it is possible to achieve further power saving. Moreover, in addition to the switch attached to the power-supply line to the main control unit, the switches are attached to power-supply lines to the modem 5 and the secondary line control device 4, respectively, so as to shut off the supply power to the modem 5 and the secondary line control device 4 when the fax controller board 1 is in the energy-saving mode; therefore, it is possible to achieve further power saving.

Figure 5:
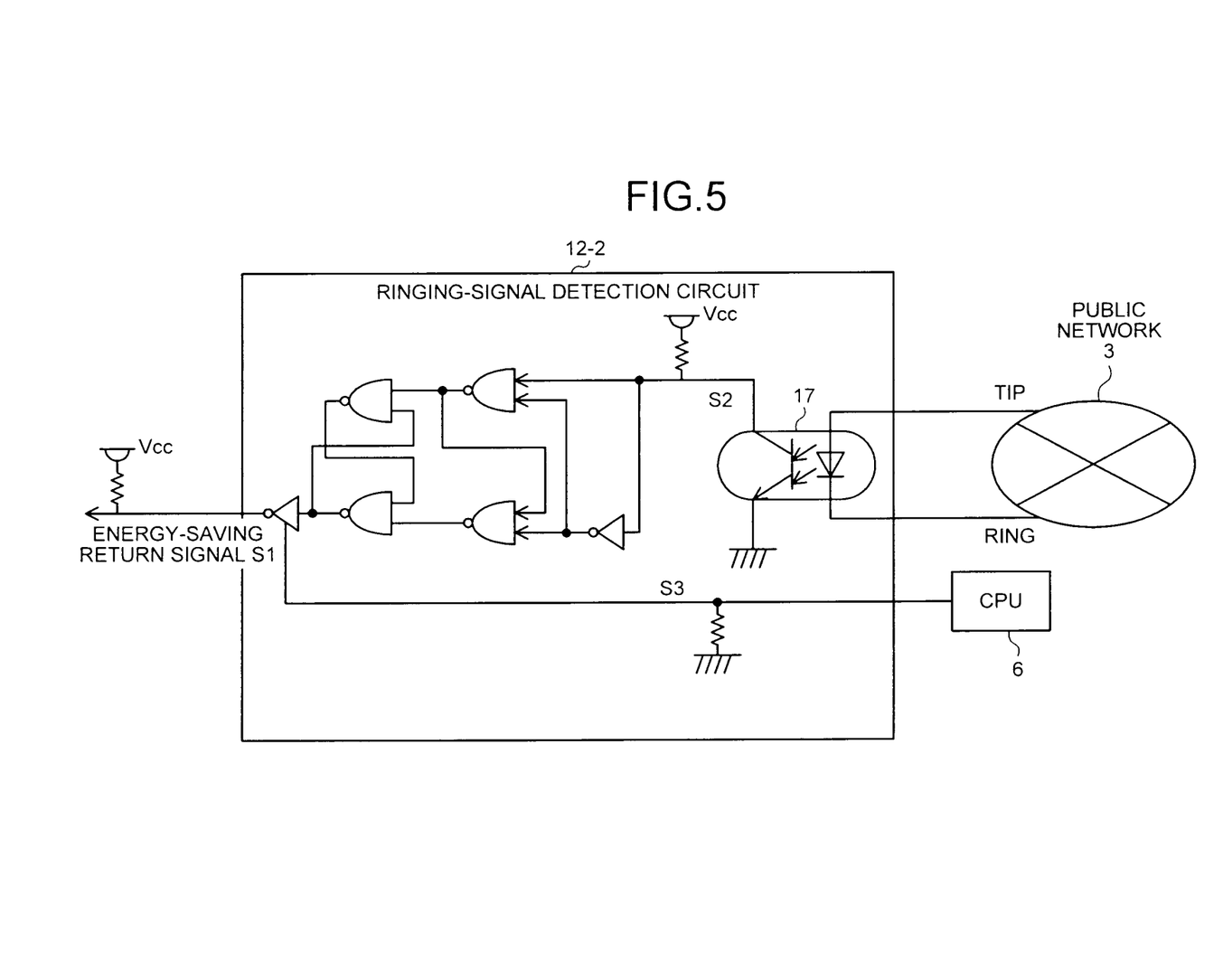
FIG. 5 is a block diagram of a ringing-signal detection circuit achieved by the use of a gate array.
Figure 6:
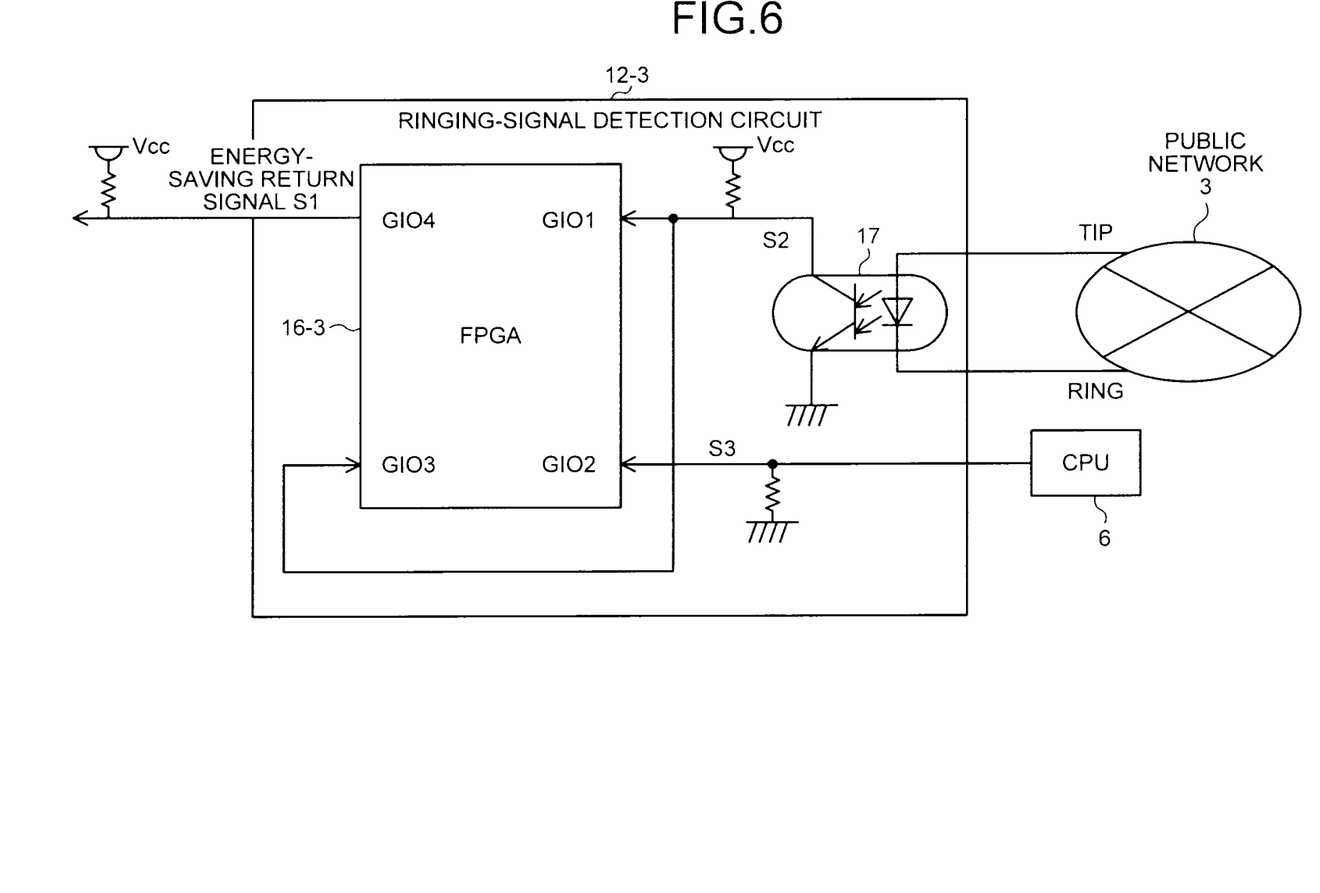
FIG. 6 is a block diagram of a ringing-signal detection circuit achieved by the use of an FPGA.

In the present embodiment, the CMOS logic is used as a logic circuit that performs ringing detection and, when detecting ringing, turns on the switches of the power supplies to the modem, the secondary circuit, and the main control unit. However, the logic circuit is not limited to this, and can be achieved by the use of a gate array or an field programmable gate array (FPGA). FIG. 5 is a block diagram showing a configuration example of a ringing-signal detection circuit 12-2 achieved by the use of a gate array. FIG. 6 is a block diagram showing a configuration example of a ringing-signal detection circuit 12-3 achieved by the use of an FPGA. In the ringing-signal detection circuit 12-3, an FPGA 16-3 implements the same function as the flip-flop 16.

Figure 7:
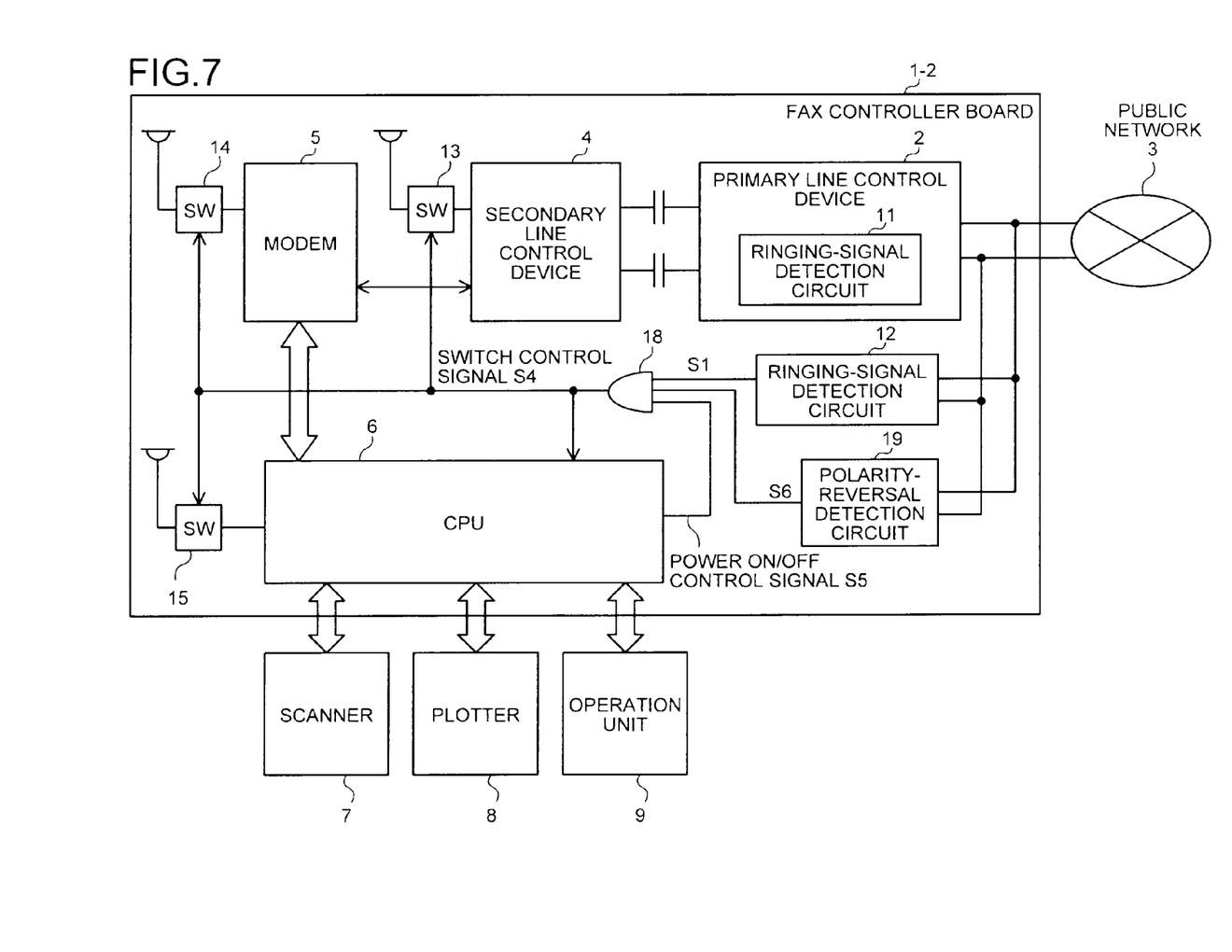
FIG. 7 is a block diagram of a fax controller board according to another embodiment.
Figure 8:
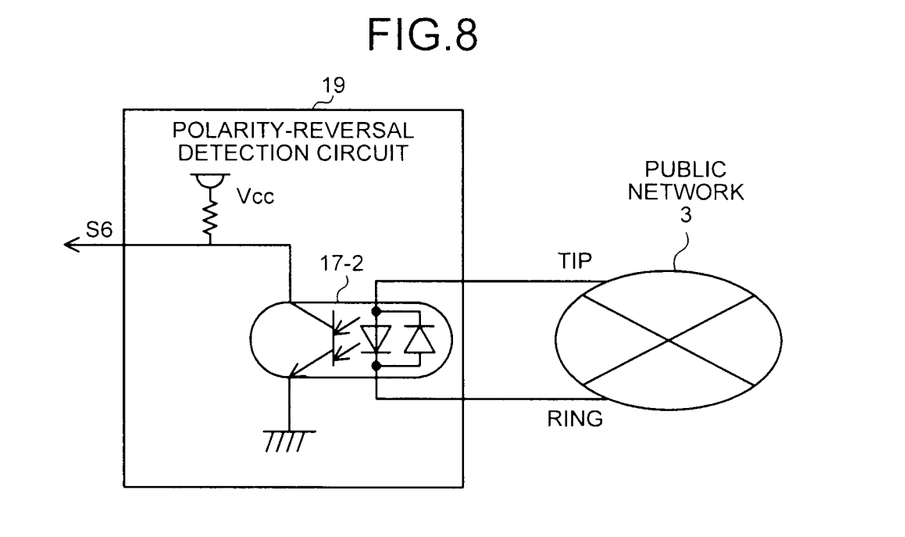
FIG. 8 is a block diagram showing a configuration example of a polarity-reversal detection circuit.

Furthermore, in addition to the configuration of the above embodiment, the fax controller board 1 can further include a polarity-reversal detection circuit 19. FIG. 7 is a block diagram showing a configuration example of a fax controller board 1-2 that further includes the polarity-reversal detection circuit 19. As shown in FIG. 7, the fax controller board 1-2 further includes the polarity-reversal detection circuit 19. This configuration enables the fax controller board 1-2 to deal with not only a ringing signal from the public network 3 but also polarity reversal. The polarity-reversal detection circuit 19 detects a polarity reversal signal indicating polarity reversal as an input signal from the public network 3. When detecting a polarity reversal signal from the public network 3, the polarity-reversal detection circuit 19 outputs Low as an output signal S6 to the logic circuit 18. FIG. 8 is a block diagram showing a configuration example of the polarity-reversal detection circuit 19. As shown in FIG. 8, the polarity-reversal detection circuit 19 includes a photocoupler 17-2.

It can be configured that the fax controller board 1-2 shown in FIG. 7 does not include the ringing-signal detection circuit 12 and inputs only the output signal of the polarity-reversal detection circuit 19 and the power on/off control signal S5 output from the CPU 6 to the logic circuit 18. This configuration enables the return from the energy-saving mode to be controlled according to detection of polarity reversal. Furthermore, in this configuration, the polarity-reversal detection circuit 19 having a simpler configuration than that of the ringing-signal detection circuit 12 can be used; therefore, it is possible to simplify the configuration of the entire apparatus and reduce the cost of the apparatus.

Figure 9:
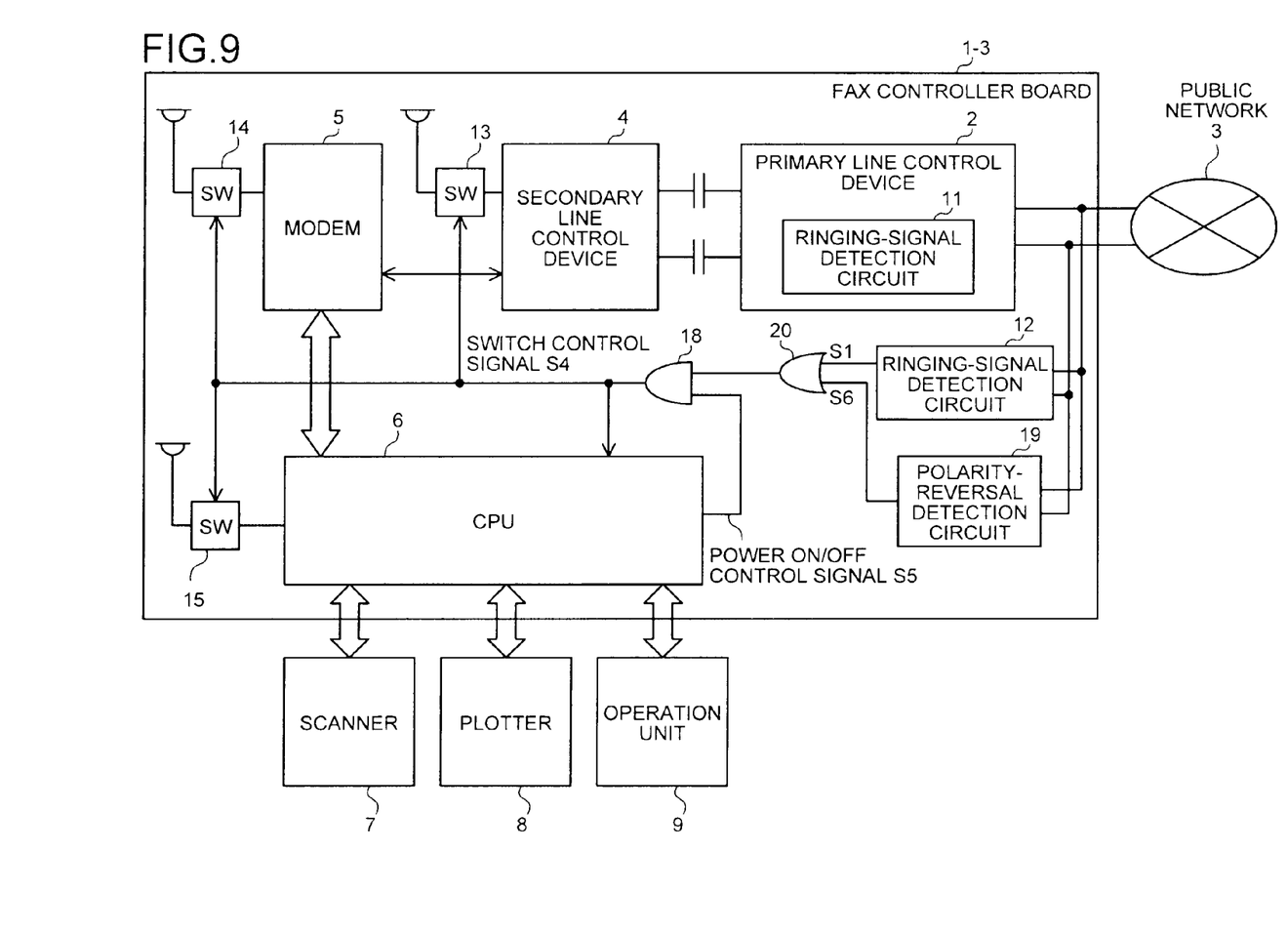
FIG. 9 is a block diagram of a fax controller board according to still another embodiment.

FIG. 9 is a block diagram showing another configuration example of the fax controller board including the polarity-reversal detection circuit 19. As shown in FIG. 9, a fax controller board 1-3 further includes an OR circuit 20 in addition to the polarity-reversal detection circuit 19. The OR circuit 20 outputs Low when the energy-saving return signal S1 and the output signal S6 are both Low. Therefore, the switch control signal S4 does not become Low unless the outputs of the ringing-signal detection circuit 12 and the polarity-reversal detection circuit 19 are both Low. In the normal state, polarity reversal occurs just before a ringing signal is input. According to the configuration shown in FIG. 9, the switch control signal S4 does not become Low unless it goes into such a normal state. Therefore, for example, even if either one of a ringing signal and a polarity reversal signal becomes Low due to generation of noise such as thunder noise, the switch control signal S4 does not become Low. Namely, according to the configuration shown in FIG. 9, it is possible to reduce the influence of noise.

According to the present invention, it is possible to provide a facsimile control apparatus capable of achieving an energy-saving mode and returning from the energy-saving mode without an energy-saving CPU.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A facsimile control apparatus comprising:
a main control unit configured so that power supply to the main control unit is shut off while the facsimile control apparatus is in an energy-saving mode;
a first switching unit configured to switch the power supply to the main control unit on/off;
a detection circuit configured to output a signal indicating return from the energy-saving mode when detecting an input signal input from a public network; and
an AND circuit that outputs a switch control signal to control the first switching unit to switch the power supply to the main control unit on, wherein
the main control unit continuously outputs a signal indicating that the facsimile control apparatus is in the energy-saving mode while the facsimile control apparatus is in the energy-saving mode, and the AND circuit outputs the switch control signal to control the first switching unit to switch the power supply to the main control unit on when the signal indicating return from the energy-saving mode and the signal indicating that the facsimile control apparatus is in the energy-saving mode are both received.

2. The facsimile control apparatus according to claim 1, wherein the detection circuit outputs the signal indicating return from the energy-saving mode when detecting a ringing signal as the input signal.

3. The facsimile control apparatus according to claim 1, wherein the detection circuit outputs the signal indicating return from the energy-saving mode when detecting a polarity reversal signal indicating polarity reversal as the input signal.

4. The facsimile control apparatus according to claim 3, wherein the detection circuit outputs the signal indicating return from the energy-saving mode when detecting the polarity reversal signal and a ringing signal as the input signal.

5. The facsimile control apparatus according to claim 4, wherein the detection circuit outputs the signal indicating return from the energy-saving mode when detecting the ringing signal as the input signal after the detection circuit detects the polarity reversal signal.

6. The facsimile control apparatus according to claim 1, further comprising:
 a modem configured so that power supply to the modem is shut off while the facsimile control apparatus is in the energy-saving mode;
 a secondary line control device configured so that power supply to the secondary line control device is shut off while the facsimile control apparatus is in the energy-saving mode;
 a second switching unit configured to switch the power supply to the modem on/off; and
 a third switching unit configured to switch the power supply to the secondary line control device on/off, wherein
 the detection circuit outputs a second switch control signal to control the second switching unit to switch the power supply to the modem on, and a third switch control signal to control the third switching unit to switch the power supply to the secondary line control device on when detecting the input signal.

7. The facsimile control apparatus according to claim 1, further comprising:
 a primary line control device that includes a second detection circuit configured to detect a ringing signal input from the public network; and
 a secondary line control device;
 wherein the primary line control device transmits the ringing signal detected by the second detection circuit to the secondary line control device to start receiving a fax when the first switching unit is turned on by the switch control signal output from the AND circuit.

* * * * *